United States Patent
Marakala et al.

(10) Patent No.: US 9,678,838 B2
(45) Date of Patent: Jun. 13, 2017

(54) PROTECTING VIRTUAL MACHINES FROM NETWORK FAILURES

(71) Applicant: VMWARE, INC., Palo Alto, CA (US)

(72) Inventors: Santhosh Marakala, Bangalore (IN); Rohit Rajanna, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/459,345

(22) Filed: Aug. 14, 2014

(65) Prior Publication Data

US 2015/0370657 A1 Dec. 24, 2015

(30) Foreign Application Priority Data

Jun. 20, 2014 (IN) .......................... 3008/CHE/2014

(51) Int. Cl.
*G06F 11/00* (2006.01)
*G06F 11/14* (2006.01)
*G06F 11/20* (2006.01)

(52) U.S. Cl.
CPC ...... *G06F 11/1484* (2013.01); *G06F 11/2041* (2013.01); *G06F 11/2097* (2013.01); *G06F 11/203* (2013.01); *G06F 11/2046* (2013.01); *G06F 11/2051* (2013.01)

(58) Field of Classification Search
CPC ............. G06F 11/1438; G06F 11/2005; G06F 11/203; G06F 11/2046; G06F 11/165; G06F 11/1464; G06F 11/1484
See application file for complete search history.

(56) References Cited

U.S. PATENT DOCUMENTS

| | | | | |
|---|---|---|---|---|
| 6,397,242 | B1* | 5/2002 | Devine | G06F 9/45533 703/27 |
| 7,213,246 | B1* | 5/2007 | van Rietsc | G06F 11/1482 707/999.202 |
| 7,987,152 | B1* | 7/2011 | Gadir | G06F 17/30566 707/602 |
| 2006/0112297 | A1* | 5/2006 | Davidson | G06F 11/1438 714/2 |
| 2007/0174660 | A1* | 7/2007 | Peddada | H04L 41/0663 714/4.1 |
| 2013/0007506 | A1* | 1/2013 | Jain | G06F 11/1484 714/4.12 |
| 2015/0278042 | A1* | 10/2015 | Antony | G06F 11/1484 714/4.11 |

* cited by examiner

*Primary Examiner* — Bryce Bonzo
*Assistant Examiner* — Jonathan Gibson

(57) ABSTRACT

Systems and techniques are described for protecting virtual machines from network failures. A described technique includes running a virtual machine on a first source host; replicating, over a first network, data related to the virtual machine to a destination host; determining that the destination host has become unreachable, over the first network, from the first source host; determining whether a second source host can reach the destination host over the first network or a second network; determining whether the virtual machine can run on the second source host; and running the virtual machine on the second source host.

19 Claims, 3 Drawing Sheets

PROTECTING VIRTUAL MACHINES FROM NETWORK FAILURES

RELATED APPLICATION

Benefit is claimed under 35 U.S.C. 119(a)-(d) to Foreign application Serial No. 3008/CHE/2014 filed in India entitled "PROTECTING VIRTUAL MACHINES FROM NETWORK FAILURES", filed on Jun. 20, 2014, by VMware. Inc., which is herein incorporated in its entirety by reference for all purposes.

BACKGROUND

This document relates to detecting network failures during replication of virtual machine (VM) data.

A virtual machine (VM) is a software-based abstraction of a physical computer system. A VM is executed on a physical computer through the use of virtualization software typically referred to as a "hypervisor." A physical computer system, referred to herein as a host, can execute one or more VMs. The hypervisor is software that is logically interposed between and interfaces with a VM and a physical computer system. In general, each VM is configured to execute an operating system, referred to herein as a guest OS, and applications.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for determining that a network failure has occurred while data related to a virtual machine (VM) is being replicated from a source host where the VM is running to a destination host. For example, the VM data may be being replicated from a source physical site to a destination physical site to ensure that data loss is minimized if a failure occurs at the source physical site, e.g., by allowing a user to re-launch the VM from the destination physical site using the replicated data.

However, if a network failure occurs while data replication is enabled for the VM, data loss may still occur, e.g., if a disaster occurs at the source physical site after the network failure has prevented certain data related to the VM from being replicated to the destination physical site. In order to mitigate the data loss that may be caused by a network failure, in response to determining that the destination host has become unreachable, a different available host can be identified and the VM can be run on the different host. Once the VM is running on the different host, replication of the VM data to the destination physical site can be resumed from the different host.

Figure 1:
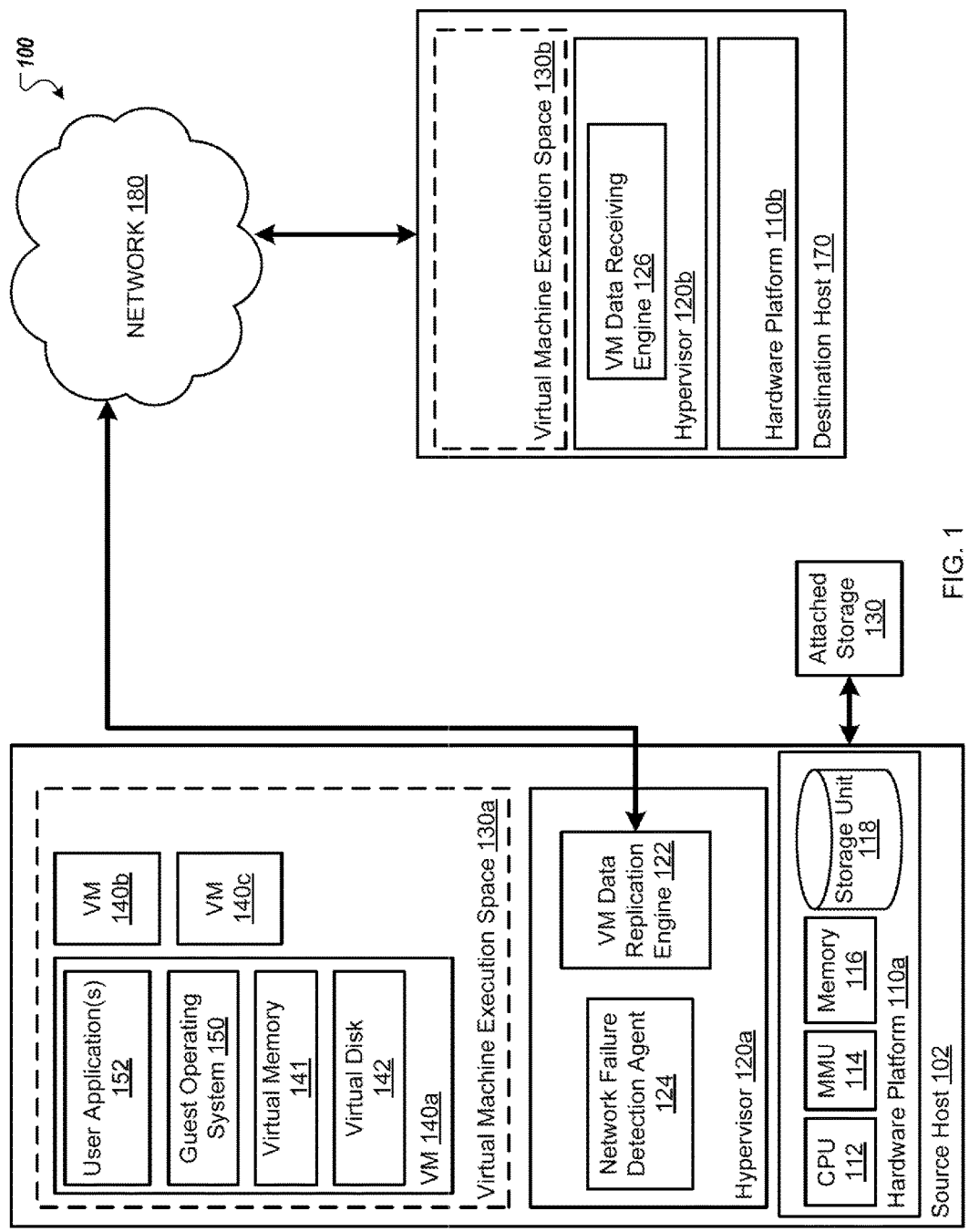
FIG. 1 shows an architecture for an example system that is configured to replicate VM data.

FIG. 1 shows an architecture for an example system 100 that is configured to replicate VM data. In the system 100, a source host 102 is configured to execute VMs 140a-140c using a hypervisor 120a. The source host 102 is a physical computer system that includes one or more data processing apparatus that each includes a hardware platform 110a. The hardware platform 110 may include, for example, a processor (CPU) 112, a memory management unit (MMU) 114, memory 116 (e.g., Random Access Memory (RAM)), a local storage unit 118 (e.g., hard disk or flash memory), a network adapter, and so on.

The hypervisor 120a is a virtualization software layer that executes on the hardware platform 110a. The hypervisor 120a manages a virtual machine execution space 130a within which one or more VMS 140a-140c may be concurrently instantiated and executed. Although three VMs 140a-140c are illustrated in FIG. 1, the hypervisor 120a can manage other numbers of VMs. For each VM 140a-140c, the hypervisor 120a manages a corresponding virtual hardware platform. Each virtual hardware platform includes emulated hardware, e.g., a virtual storage device, a virtual network adapter/interface, virtual memory, a virtual processor, and so on.

Each VM 140a-140c managed by the hypervisor 120a executes a guest operating system, e.g., guest OS 150, that executes user applications, e.g., user applications 152. The hypervisor 120 transforms input/output (I/O) requests from the guest OS 150 to the corresponding virtual hardware platform into corresponding requests to the hardware platform 110a.

Each VM also includes virtual storage for storing data related to the VM. The virtual storage can include, e.g., virtual memory 141 and a virtual disk 142. The guest OS 150 and/or the user applications 152 can store data to and access data from the virtual memory 141 and the virtual disk 142. The hypervisor 120a can map the VM's virtual storage to hardware storage, e.g., hardware memory 116, local storage unit 118, or attached storage 130. The attached storage 130 may be, e.g., network-attached storage (NAS), storage attached to the source host 102 using a storage area network (SAN), or storage that is otherwise attached to the source host 102. As will be described in more detail below with reference to FIG. 2, the attached storage 130 may be shared between the host 102 and other hosts executing other VMs.

For example, when the guest OS 150 writes data to virtual memory 141, the hypervisor 120a can store the data in a corresponding location in hardware memory 116 based on the mapping. Similarly, when the guest OS 150 requests data from virtual memory 141, the hypervisor 120a can obtain the data from hardware memory 116 and provide the data to the guest OS 150. Similar mapping can be used to map the virtual disk 142 to the attached storage 130 or to the local storage unit 118.

In some implementations, one or more of the VMs 140a-140c executing on the source host 102 are configured for data replication. For example, a user may enable data replication for a VM launched by the user or data replication may be enabled for the VM by default when the VM is launched in order to allow the user to re-launch the VM at a different site in case of a failure at the site where the source host 102 is located. Thus, when data replication is enabled for the VM 140a, data related to the VM 140a can be replicated to a destination host 170, e.g., a host in a different physical location from the source host 102, over a network 180 to allow the user to re-launch the VM using the replicated data in case of a failure at the location of the source host 102. The network 180 can be, e.g., a local area network (LAN) or a wide area network (WAN), e.g., the Internet, or a combination of networks.

In order to replicate the data for the VMs 140a-140c, the hypervisor 120a includes a VM data replication engine 122 that transmits data for the VMs 140a-140c for which data replication is enabled to the destination host 170 over the network 180. In particular, in response to determining that replication has been enabled for a given VM executing on the source host 102, the VM replication engine 122 can copy data stored by the VM in the virtual storage for the VM, e.g., data stored in the virtual disk 142 for the VM 140a, the virtual memory 141, or both, to the destination host 170 over the network 180.

The destination host 170 includes a physical hardware platform 110b and a hypervisor 120b that manages a virtual machine execution space 130b within which one or more VMs may be concurrently instantiated and executed. Once data relating to the VM has been received at the destination host 170, a VM data receiving engine 126 executing in the hypervisor 120b or elsewhere on the destination host 170 can use the copied data to generate an offline copy of the VM for use in restoring the VM, e.g., in response to a request received from the user or automatically in response to a failure occurring at the site where the source host 102 is located. That is, the destination host 170 can, in response to the request or automatically, instantiate a new VM in the virtual machine execution space 130b using the offline copy of the VM.

After the data stored by the VM in the virtual storage for the VM has been copied, the VM data replication engine 122 can periodically, e.g., at pre-determined or user-specified time intervals, analyze the virtual storage for the VM to determine whether any of the data stored in the virtual storage has changed, e.g., if any of the blocks in the virtual disk for the VM that are stored in the attached storage 130 have changed, since the most recent time that the VM data replication engine 122 copied data to the destination host 170. If the VM data replication engine 122 identifies any changed data, the VM data replication engine 122 copies the changed data to the destination host 170 over the network 180, e.g., without copying data that has not changed during the current time interval.

In some cases, however, replication of data to the destination host 170 may be interrupted by a network failure, i.e., a failure that makes the destination host 170 unreachable from the source host 102 over the network 180. For example, the network failure may be a hardware failure, e.g., a failure of a network interface card, a router, or a switch interposed along the network communication path between the VM data replication engine 122 and the destination host 170, that prevents the VM data sent by replication engine 122 from reaching the destination host 170 over the network 180. When a network failure occurs while replication is activated for one of the VMs 140a-140c, changed VM data for the VM cannot be sent to the destination host 170. Thus, if a disaster occurs while data is not being replicated, a data loss may occur, e.g., because the offline copy of the VM stored at the destination host 170 will be out of date with respect to the VM executing on the source host 102.

In order to mitigate the effects of a network failure, the hypervisor 120 includes a network failure detection agent 124. The network failure detection agent 124 detects whether a network failure has occurred that prevents the transfer of VM data to the destination host 170 and, if a network failure is detected, determines whether another host is available to execute the VMs that are executing on the source host 102. Determining that a network failure has occurred and determining whether another host is available is described in more detail below with reference to FIG. 3. If another host is available, the network failure detection agent 124 causes the VM to be executed by the other host, e.g., so that replication of data for the VM can be continued while the VM is executing on the other host.

In some implementations, one or more VMs for which replication is enabled may be included in a high availability (HA) cluster. In an HA cluster, the high availability of VMs executing on hosts in the cluster is ensured by monitoring the state of the VMs in the cluster and restarting VMs on a different host within the cluster when a failure is detected.

Figure 2:
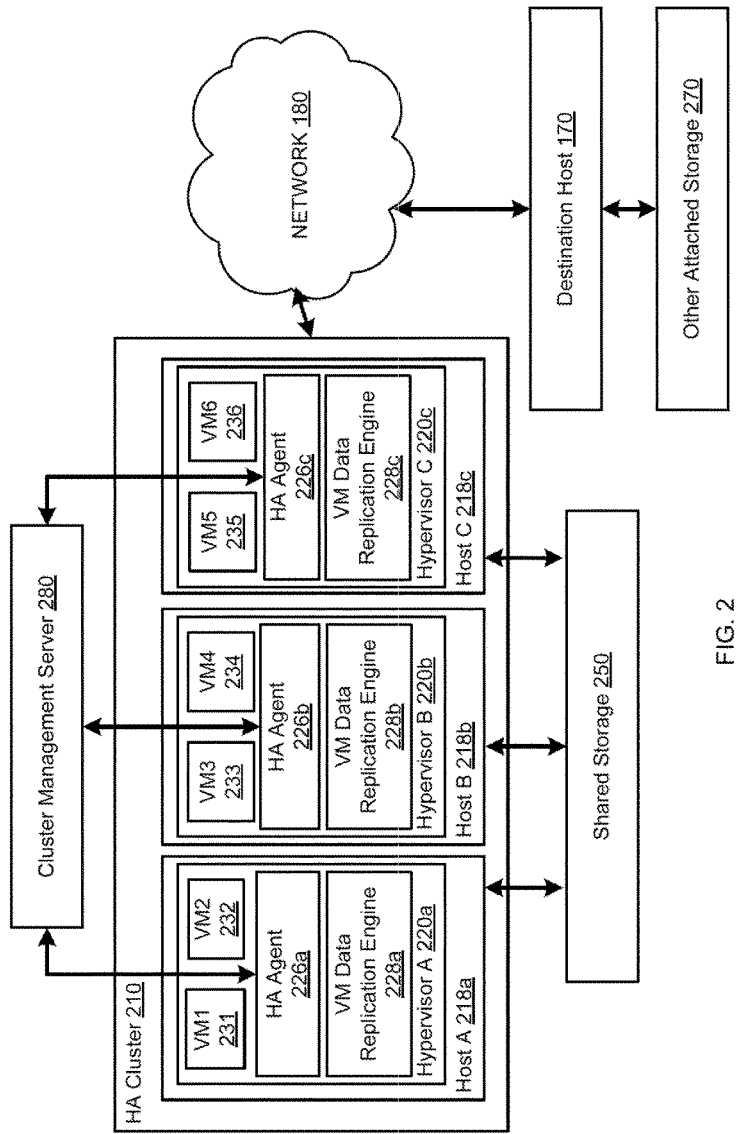
FIG. 2 shows an architecture for an example system configured to replicate VM data in a high availability cluster.

FIG. 2 shows an architecture for an example system 200 configured to replicate VM data in an HA cluster 210. The HA cluster 210 includes hosts 218a-218c that each executes a hypervisor, i.e., hypervisors 220a-220c. In this example, the hypervisors 220a-220c each manage the execution of two VMs. Of course, the HA cluster 210 can include a different number of hypervisors and each hypervisor can manage a different number of VMs, e.g., the hypervisor 220a may manage one number of VMs while the hypervisor 220b may manage a different number of VMs.

Each hypervisor 220a-220c includes a respective HA agent 226a-226c. Each HA agent 226a-226c can monitor VMs within the HA cluster that are running on the corresponding host 218a-218c. In particular, the HA agent 226a monitors VMs 231 and 232; the HA agent 226b monitors VMs 233 and 234; and the HA agent 226c monitors VMs 235 and 236. Each hypervisor 220a-220c stores data relating to the VMs monitored by the hypervisor in a shared storage 250. The shared storage 250 is attached storage that is accessible by each host 218a-218c in the HA cluster 210.

A cluster management server 280 manages the configuration of the HA cluster 210. The cluster management server 280 manages which VMs and which hosts are included in the HA cluster 210 and other configuration information for the HA cluster, including which host is configured as the master node for the cluster.

Generally, at any given time, one of the hosts in the HA cluster 210 is configured as the master node for the cluster, with the remainder of the hosts in the HA cluster 210 being configured as slave nodes for the cluster. The master HA agent, i.e., the HA agent executing on the master node, monitors the state of VMs executing on the slave nodes, and, if the state of one of the VMs indicates that the VM should be restarted, the master HA agent restarts the VM on a different host in the cluster. For example, each HA agent executing on a slave node may be configured to send a heartbeat to the master HA agent at regular time intervals. If the master HA agent has not received a heartbeat from a particular HA agent for more than threshold period of time, the master HA agent can restart the VMs managed by the particular HA agent on a different host in the HA cluster. In some implementations, in order to allow the master VM to restart any of the VMs in the cluster on a different host, each VM in the HA cluster stores data to a storage that is shared between each of the VMs in the HA cluster.

Each hypervisor also includes a respective VM data replication engine 228a-228c. Each VM data replication engine 228a-228c can monitor the VMs running on the corresponding host to determine whether VM data replication is enabled for the VMs, and if VM data replication is enabled, copy VM data for the VMs that is stored in the shared storage 250 to a destination host, e.g., the destination host 170, over the network 180. In some implementations, the data for each VM is copied to the same destination host. In some other implementations, the data for the VMs is copied to different destination hosts. Generally, each destination host to which VM data is copied is a destination host that is not in the HA cluster 210 and does not have access to the shared storage 250 for the cluster. For example, the destination host 170 is connected to other attached storage 250 but is not connected to and cannot access the shared storage 250 for the HA cluster 210.

Each HA agent 226a-226c can also perform the functions of (or include) a network failure detection agent, e.g., the network failure detection agent 124 of FIG. 1. That is, during replication, each HA agent can determine whether a network failure has occurred that has made the destination host 170 unreachable over the network 180. When an HA agent executing on a slave node determines that a network failure has occurred and that the destination host 170 is unreachable, the HA agent can provide an indication of the failure to the master HA agent and receive from the master HA agent data identifying an available other host or data indicating that no other host is available. If the master HA agent has identified an available other host, the slave HA agent causes the VM to be run on the other host.

Figure 3:
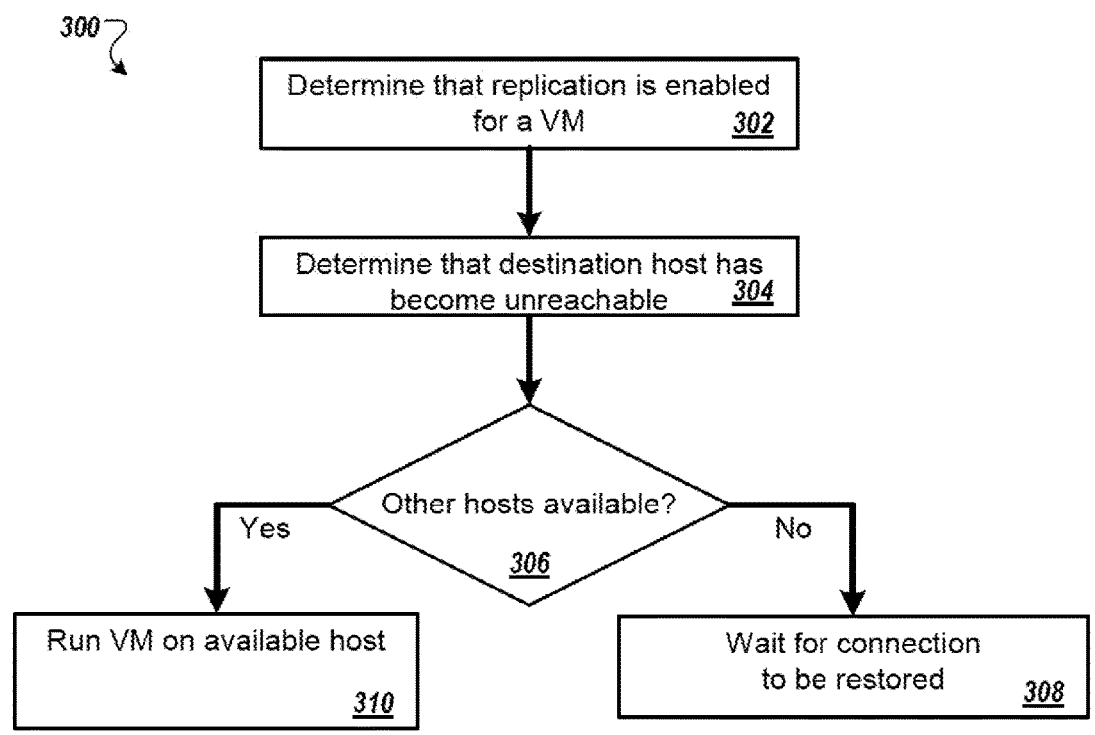
FIG. 3 is a flow diagram of an example process for detecting network failures during VM data replication.

FIG. 3 is a flow diagram of an example process 300 for detecting a network failure during VM data replication. The example technique 300 is performed by a system of one or more computers, e.g., one or more of the hosts in an HA cluster, e.g., the HA cluster 210 of FIG. 2.

The system determines that VM data replication has been enabled for a VM running on a source host (302). For example, the system can determine that VM data replication has been enabled for a particular VM and, in response, copy data stored by the VM in virtual storage associated with the VM to a destination host in a different physical location from the source host. Once the stored data has been copied, the system can periodically analyze the virtual storage for the VM to identify changed data and, when changed is identified, copy the changed data to the destination host.

While replication is enabled for the VM, the system determines that the destination host has become unreachable over the network, e.g., because a network failure has occurred (304). The system can determine that that the destination host has become unreachable in any of a variety of ways.

For example, the system can determine that the destination host has become unreachable when the system determines that VM data sent by the system to the destination host has not been successfully transmitted. In particular, the system can determine that the data sent to the destination host has not been successfully transmitted in response to receiving an event from a VM data replication engine executing on the source host that indicates that receipt of the data by the destination host could not be validated.

As another example, the system can periodically, e.g., at pre-determined or user specified time intervals, determine the availability of the source host over the network used to replicate VM data to the destination host. For example, the system can determine the availability of the destination host by transmitting a ping request to an internet protocol (IP) address associated with the destination host over the network. If the system does not receive a response to the ping request within a threshold time window of sending the request, the system determines that the source host is unreachable and that a network failure has occurred.

The system determines whether other hosts are available for execution of the VM (step 306). If the source host is in an HA cluster, the other hosts can include hosts in the same HA cluster as the source host. The system can determine whether another host is available to execute the VM by determining whether the other host meets one or more availability criteria.

If the VM is included in an HA cluster and the source host has been configured as a slave node for the cluster, the system can determine whether another host is available by transmitting an indication that the destination host has become unreachable to the host that has been configured as the master node for the VM cluster. In response to receiving a request from a slave node, the master node can determine whether another host is available, i.e., by determining whether any other hosts satisfy the availability criteria.

If the VM is included in an HA cluster and the source host has been configured as a master node for the cluster, the source host determines whether another host is available by determining whether any other VMs satisfy the availability criteria.

The availability criteria include a criterion that specifies that an available host must be reachable over a network. The system can determine that a host is reachable in any of a variety of ways. For example, in some implementations, the system considers any host for which a failure has not been detected as a reachable virtual machine, i.e., for which no network failure has been detected along a network communication path between the source host and the host. In some other implementations, the system sends a ping request to a network address, e.g., an Internet Protocol (IP) address, of the other host. If the system receives a response, the system determines that the other host is a reachable host and, if the system does not receive a response, the system determines that the other host is not reachable.

In some implementations, the availability criteria also include a criterion that specifies that an available host must be able to reach the destination host over a network, i.e., over the same network that was being used by the source host to reach the destination host or over a different network. For example, the system can provide a network address for the destination host to the other host and the other host can send a ping request to the destination host to determine whether the other host can reach the destination host. In some implementations, the network address is provided to each of a set of candidate other hosts, e.g., to each other host in the same HA cluster as the source host, when replication of the VM data to the destination host is initiated. Each candidate other host can then be configured to periodically ping the destination host and to notify the master node for the HA cluster if the destination host has become unreachable. In these implementations, the system can consider each candidate other host that has not reported that the destination host has become unreachable as being able to reach the other host.

The availability criteria also include a criterion that specifies that the VM must be able to run on each available host. In particular, the criterion can specify that an available host must have sufficient available resources, e.g., memory, CPU cycles, network bandwidth, and so on, to successfully run the VM on the host. For example, the system can obtain data from each of the candidate hosts that identifies the amount of available resources on the candidate host. The system can then determine that the candidate host has sufficient available resources if the host has more than a threshold amount of available resources. Different kinds of resources can be associated with different threshold amounts.

Optionally, the criterion may also specify that the other host be configured to replicate data for VMs executing on the host, e.g., by virtue of having a VM data replication engine or other VM data replication software executing in the hypervisor of the host. If the VM is included in an HA cluster, the availability criteria may also specify that the other host must be configured to execute VMs in HA clusters, e.g., by virtue of having an HA agent or other appropriate software executing in the hypervisor of the host.

If no other hosts are available to run the VM (step 308), the system waits for the network connection to the destination host to be restored, e.g., in order to resume replication of data for the VM to the destination host.

If another host is available, the system causes the VM to run on the other host (step 310), e.g., so that replication of data for the VM can be continued from the other host. If the system determines that more than one host is available, the system selects one of the available hosts to run the VM. For example, the system can select one of the available hosts randomly. As another example, the system can select the available host that has the most available resources. As yet another example, the system can select the available host that has the best network connection with the source host. Other ways of selecting an available host when more than one host is available are possible.

The system can cause the VM to run on the other host by initiating a live migration of the VM to the other host. For example, the system can send a request to the cluster management server for the HA cluster to initiate the live migration of the VM. During a live migration, VM data is copied from the attached storage for the source host or from the storage unit for the source host to storage for the other host while the VM continues to run on the source host. Once the VM data has been copied, the VM is paused on the source host and resumed on the other host. Alternatively, e.g., if the cluster management server for the HA cluster is not available and the other host is connected to the same shared storage as the source host and has access to the VM data for the VM that is stored on the shared storage, the system can shut down the VM on the source host and re-start the VM on the other host using the VM data in the shared storage. In some cases, the system can use a Fast Suspend Resume (FSR) technique to reduce downtime of the VM.

In some cases, if the source host is included in an HA cluster, the network failure may cause a partition in the HA cluster. That is, the network failure may partition the hosts in the cluster such that hosts in one partition can only reach other hosts in the same partition while not being able to reach any hosts in any other partition. When the cluster is partitioned, a new master node is elected for each partition that does not include the master node for the cluster. In these circumstances, if the master node for the partition that includes the host running the VM cannot identify an available other host, the VM can be caused to run on an available host in another partition. For example, the master node for the partition that includes the host running the VM can suspend the VM and unregister the VM, and the master in the other partition can resume the VM on an available host in the other partition and then continue replication of the VM data while the VM is running on the available host.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network C("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
running a virtual machine on a first source host;
replicating, over a first network, data related to the virtual machine to a destination host, wherein the data related to the virtual machine comprises data stored by the virtual machine in virtual storage associated with the virtual machine;
during the replicating of the data related to the virtual machine to the destination host, identifying a network failure of the first network;
determining, based on identifying the network failure of the first network, that the destination host has become unreachable, over the first network, from the first source host, and, in response:
determining that a second source host can reach the destination host over the first network or over a second network;
determining that the virtual machine can run on the second source host; and
based on determining that the second source host can reach the destination host and determining that the virtual machine can run on the second source host, running the virtual machine on the second source host instead of on the first source host, wherein running the virtual machine on the second source host includes providing access to virtual machine data to the virtual machine running on the second source host including virtual machine data that has not been replicated to the destination host, and continuing the replication of the data related to the virtual machine from the second source host to the destination host.

2. The method of claim 1 wherein determining that the destination host has become unreachable comprises:
determining that data sent to the destination host during the replication has not been successfully transmitted to the destination host.

3. The method of claim 1 wherein the virtual machine is in a high availability duster of virtual machines, wherein the first source host has been configured as a slave node for the high availability cluster, and wherein determining whether a second source host can reach the destination host and determining whether the virtual machine can run on the second source host comprises:
providing, by the first source host, an indication that the destination host has become unreachable to a host that has been configured as a master node for the high availability cluster; and
determining, by the host that has been configured as the master node, whether the second source host can reach the destination host and whether the virtual machine can run on the second source host.

4. The method of claim 1, wherein the virtual machine is in a high availability cluster of virtual machines, wherein the source host has been configured as a master node for the high availability cluster, and wherein determining whether a second source host can reach the destination host and determining whether the virtual machine can run on the second source host comprises:
determining, by the first source host, whether the second source host can reach the destination host and whether the virtual machine can run on the second secure host.

5. The method of claim 1, further comprising:
determining that the second source host is reachable by the first source host over the first network or over a different network.

6. The method of claim 5, wherein determining that the second source host is reachable comprises:
sending a ping request to the second source host over the first network or the different network; and
receiving a response to the ping request from the second source host.

7. The method of claim 1, wherein determining that the second source host can reach the destination host comprises:
determining that no network failure has been detected on a network communication path between the second source host and the destination host.

8. The method of claim 1, wherein determining that the virtual machine can run on the second source host comprises:
determining that the second source host has sufficient available resources to run the virtual machine.

9. The method of claim 1, wherein running the virtual machine on the second source host comprises:
migrating the virtual machine to the second source host.

10. The method of claim 1, wherein running the virtual machine on the second source host comprises:
suspending the virtual machine on the first source host; and
resuming the virtual machine on the second source host.

11. A system comprising one or more computers and one or more storage devices storing instructions that when executed by the one or more computers cause the one or more computers to perform operations comprising:
running a virtual machine on a first source host;
replicating, over a first network, data related to the virtual machine to a destination host, wherein the data related to the virtual machine comprises data stored by the virtual machine in virtual storage associated with the virtual machine;
during the replicating of the data related to the virtual machine to the destination host, identifying a network failure of the first network;
determining, based on identifying the network failure of the first network, that the destination host has become unreachable, over the first network, from the first source host, and, in response:
determining that a second source host can reach the destination host over the first network or over a second network;
determining that the virtual machine can run on the second source host; and
based on determining that the second source host can reach the destination host and determining that the virtual machine can run on the second source host, running the virtual machine on the second source host instead of on the first source host, wherein running the virtual machine on the second source host includes providing access to virtual machine data to the virtual machine running on the second source host including virtual machine data that has not been replicated to the destination host, and continuing the replication of the data related to the virtual machine from the second source host to the destination host.

12. The system of claim 11, the operations further comprising:
continuing the replication of the data related to the virtual machine data from the second source host to the destination host.

13. The system of claim 11, wherein the virtual machine is in a high availability cluster of virtual machines, wherein the first source host has been configured as a slave node for the high availability cluster, and wherein determining whether a second source host can reach the destination host and determining whether the virtual machine can run on the second source host comprises:
providing, by the first source host, an indication that the destination host has become unreachable to a host that has been configured as a master node for the high availability cluster; and
determining, by the host that has been configured as the master node, whether the second source host can reach the destination host and whether the virtual machine can run on the second source host.

14. The system of claim 11, wherein the virtual machine is in a high availability cluster of virtual machines, wherein the source host has been configured as a master node for the high availability cluster, and wherein determining whether a second source host can reach the destination host and determining whether the virtual machine can run on the second source host comprises:
determining, by the first source host, whether the second source host can reach the destination host and whether the virtual machine can run on the second source host.

15. The system of claim 11, wherein determining that the second source host can reach the destination host comprises:

determining that no network failure has been detected on a network communication path between the second source host and the destination host.

16. A non-transitory computer storage medium, encoded with a computer program, the computer program comprising instructions that when executed by one or more computers cause the one or more computers to perform operations comprising:
running a virtual machine on a first source host;
replicating, over a first network, data related to the virtual machine to a destination host, wherein the data related to the virtual machine comprises data stored by the virtual machine in virtual storage associated with the virtual machine;
during the replicating of the data related to the virtual machine to the destination host, identifying a network failure of the first network;
determining, based on identifying the network failure of the first network, that the destination host has become unreachable, over the first network, from the first source host, and, in response:
determining that a second source host can reach the destination host over the first network or over a second network;
determining that the virtual machine can run on the second source host; and
based on determining that the second source host can reach the destination host and determining that the virtual machine can run on the second source host, running the virtual machine on the second source host instead of on the first source host, wherein running the virtual machine on the second source host includes providing access to virtual machine data to the virtual machine running on the second source host including virtual machine data that has not been replicated to the destination host, and continuing the replication of the data related to the virtual machine from the second source host to the destination host.

17. The computer storage medium of claim 16, the operations further comprising:
continuing the replication of the data related to the virtual machine data from the second source host to the destination host.

18. The computer storage medium of claim 16, wherein the virtual machine is in a high availability cluster of virtual machines, wherein the first source host has been configured as a slave node for the high availability cluster, and wherein determining whether a second source host can reach the destination host and determining whether the virtual machine can run on the second source host comprises:
providing, by the first source host, an indication that the destination host has become unreachable to a host that has been configured as a master node for the high availability cluster; and
determining, by the host that has been configured as the master node, whether the second source host can reach the destination host and whether the virtual machine can run on the second source host.

19. The computer storage medium of claim 16, wherein the virtual machine is in a high availability cluster of virtual machines, wherein the source host has been configured as a master node for the high availability cluster, and wherein determining whether a second source host can reach the destination host and determining whether the virtual machine can run on the second source host comprises:
determining, by the first source host, whether the second source host can reach the destination host and whether the virtual machine can run on the second source host.

* * * * *